Inventors:
Charles R. Crane II &
William J. Gartz
By Joseph O. Lange Atty.

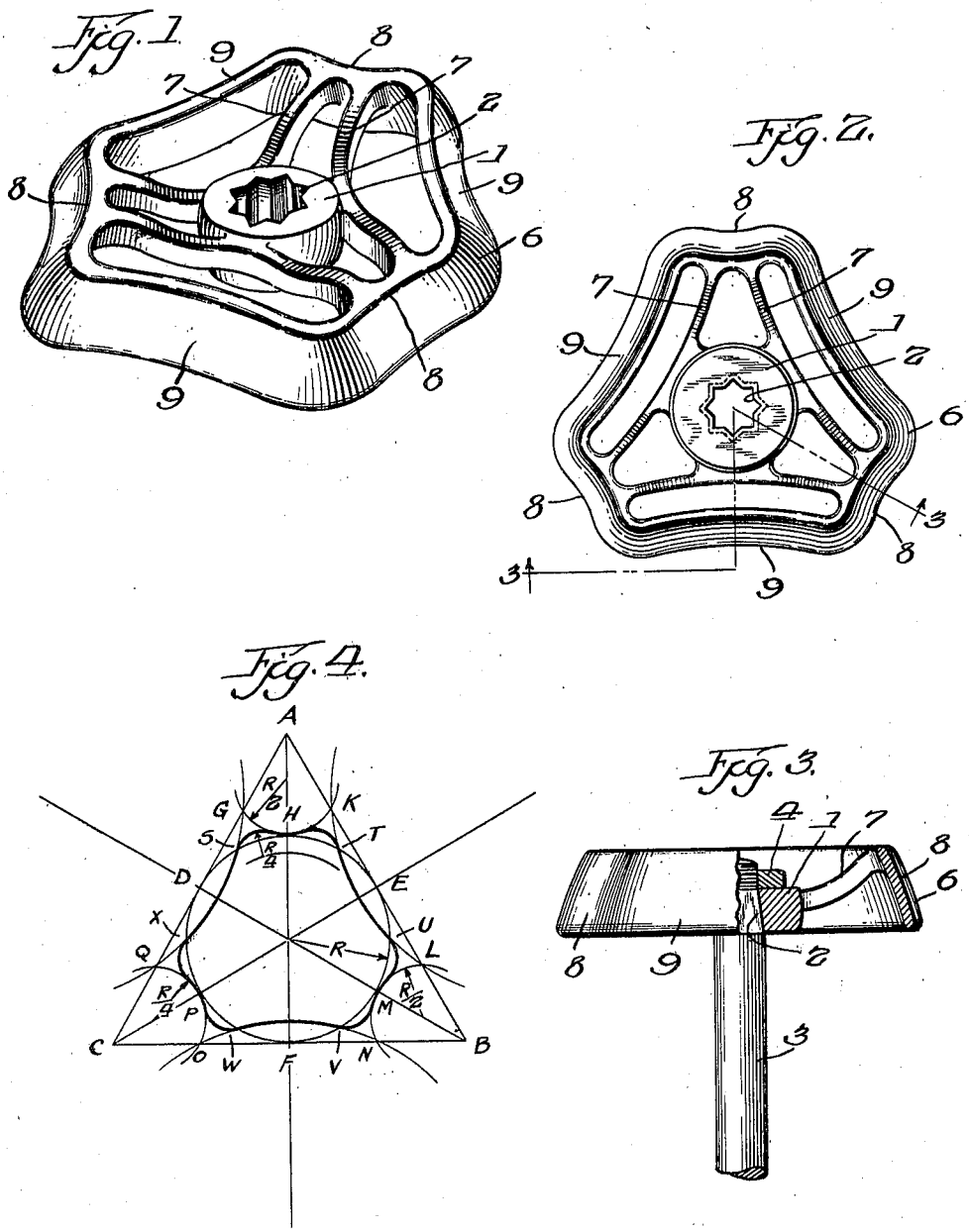

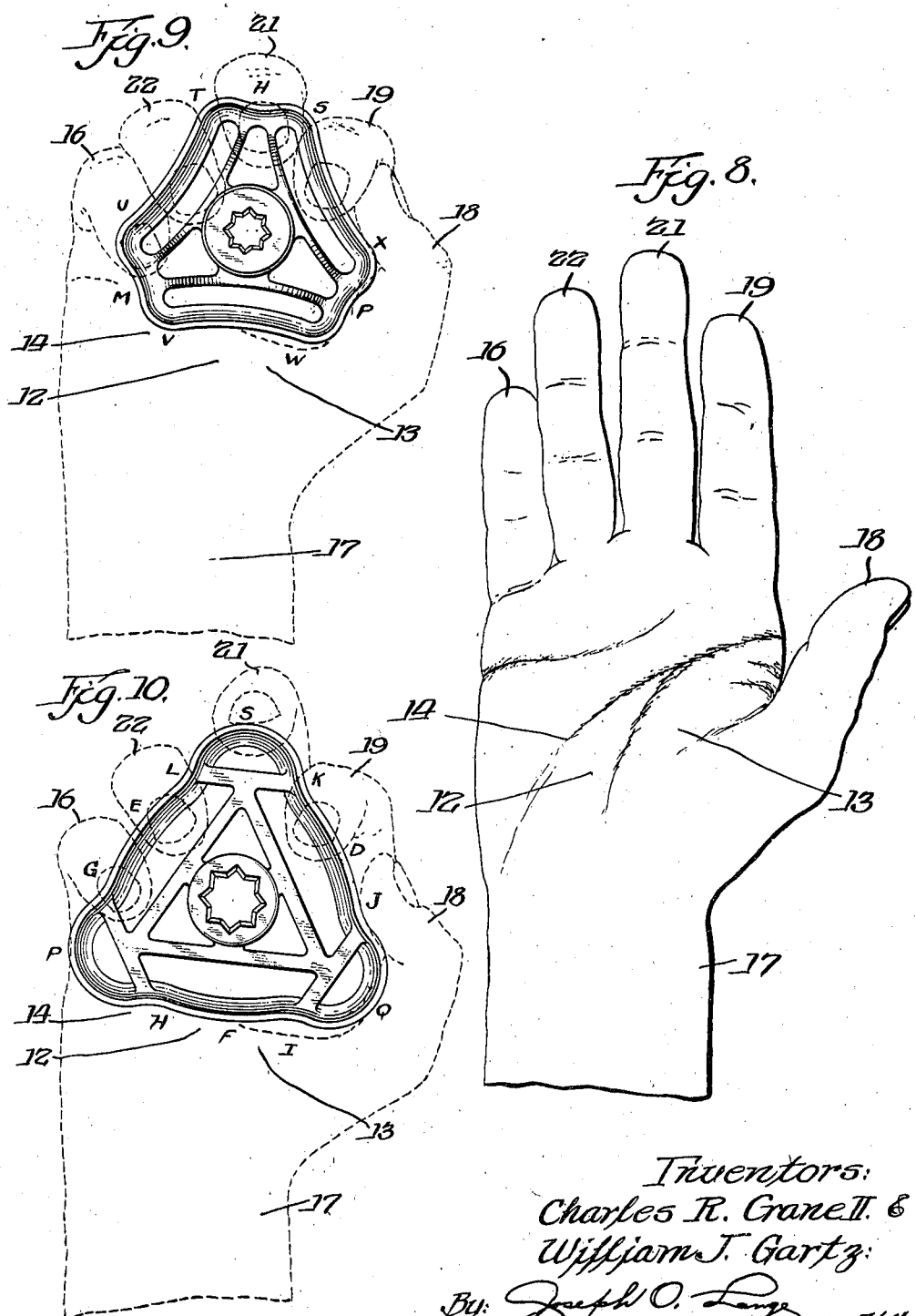

Patented Jan. 5, 1943

2,307,392

UNITED STATES PATENT OFFICE 2,307,392

VALVE HANDWHEEL

Charles R. Crane, II, and William J. Gartz, Chicago, Ill., assignors to Crane Co., Chicago, Ill., a corporation of Illinois Application March 12, 1941, Serial No. 382,896

2 Claims. (Cl. 74—553)

Our invention relates to valve handwheels and more specifically to novel valve handwheels which are especially shaped to secure the maximum amount of turning effort from the human hand.

Heretofore, there has been little or no progress in providing a handwheel in which the human hand was really well fitted and so comfortably positioned that when applying the usual high torques necessary in opening and closing valves the latter operations are relatively simple and devoid of great effort.

A primary feature of our invention therefore lies in the provision of a handwheel rim of substantially triangular shape in plan whereby the heel of the operator's hand may be utilized fully in the effort required in opening or closing a valve.

Another feature of the invention lies in the provision of a triangular-shaped valve handwheel or the like having depressed or concave surfaces to minimize the tendency of the operator's hand to slip off when applying high seating or unseating torques during the closing or opening of a valve.

Still another object lies in the provision of a valve handwheel having generally the shape of a triangle in which the apices have been flattened and formed concave thereby providing a slight recess or depression for the operator's middle finger.

It is generally preferred that a valve handwheel should be as small and as light in weight as possible in order to minimize the dead weight suspended from pipe lines and also to require a minimum amount of space in storage, shipment and upon installation. Also, it must be shaped so as to allow an operator to apply the greatest possible turning effort with his bare hands and preferably from as many directions as possible, yet the wheel must be simple enough to be cheaply manufactured and sufficiently rugged to withstand a great deal of abuse even if a Stillson or other wrench is applied in increasing the torque. Further, it must be so constructed with heat radiating or heat insulating means as to maintain the rim cool enough to handle regardless of the amount of heat conducted from the body by the stem. These are the problems involved in constructing a valve handwheel as contrasted with a handle for a door or the like.

Still another object of our invention is the provision of a valve handwheel shaped in the form of a triangle whose apices have been rounded and which preferably have two slight depressions or concave portions in each side, adjacent the rounded apices whereinto the ball of the human palm and the hypothenar eminence thereof may be fitted and thus retain the grasp of the hand more tightly when applying high torques to the wheel.

Other advantages and objects of our invention will become more readily apparent in connection with the drawings illustrating preferred forms, in which Fig. 1 is a perspective view of one form of wheel exemplifying our invention.

Fig. 2 is a plan view of the wheel shown in Fig. 1.

Fig. 3 is an elevation view of the wheel shown in Fig. 1, sectioned along the line 3—3 of Fig. 2 and assembled on a valve stem.

Fig. 4 is a graphical description of the outside rim contour of the handwheel shown in Figs. 1, 2 and 3.

Fig. 8 shows a normal human hand, and is presented for purposes hereinafter explained in detail.

Fig. 9 shows a normal human hand as applied to a handwheel such as illustrated in Fig. 1.

Fig. 10 shows a normal human hand as applied to a handwheel such as illustrated in Fig. 5.

Figure 5:
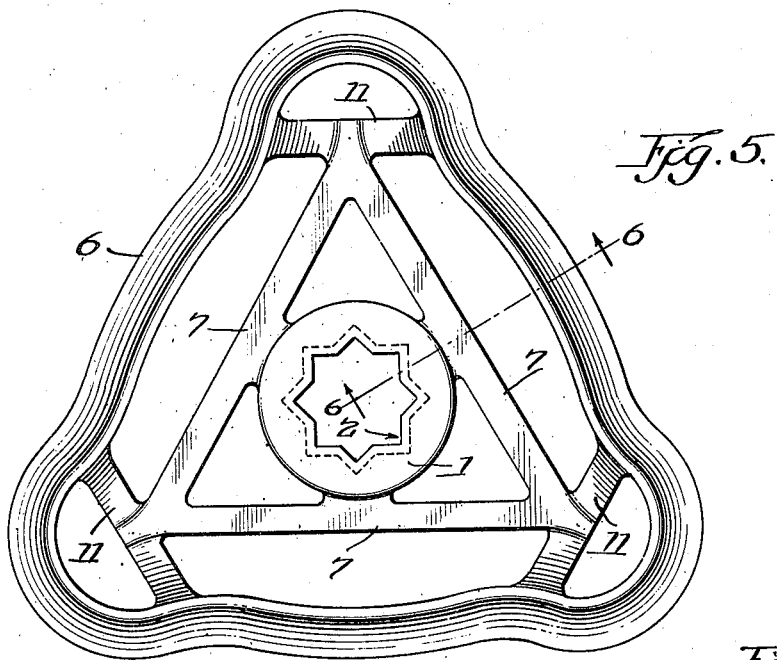
Fig. 5 is a plan view of a handwheel illustrating another embodiment of our invention.
Figure 6:
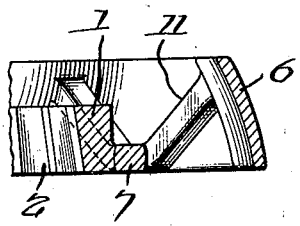
Fig. 6 is a sectional view taken on the line 6—6 of Fig. 5.

Referring now to the drawings in detail, the handwheel in Fig. 1 comprises broadly a hub 1 having a tapered octagonal opening 2 in which is normally fitted a tapered square portion of a threaded valve stem 3 or the like which is usually held in place by the threaded nut 4. It will be noted that the handwheel is preferably constructed so that neither the stem 3 nor the nut 4 extends above the upper surface of the rim 6 which is connected to the hub 1 by means of the arms or ribs 7. The latter arrangement prevents the operator's hand from coming into direct contact with the stem or nut which latter members are likely to be very hot due to the conduction from the inside of the body. It will be noted further that the arms or connecting ribs 7 are made as long as possible in order to dissipate the maximum amount of heat and to maintain the rim 6 relatively cool with respect to the stem. For convenience, the shape of the rim 6 in plan may be described as that of an equilateral triangle in which the apices have been cut off to form a six-sided figure whose three newly generated sides are about half the length of the remaining portion of the sides of the original triangle. To complete the shape of the rim 6 from this imaginary figure, all six sides are formed concave and preferably all corners are well rounded, thereby producing a hexagonal or modified triangular rim having the three short sides designated 8 and the three long sides 9, all six being concave or outwardly hollow in a plan view (Fig. 2) and convex in elevation as shown more clearly in Fig. 3.

The general method of approach in determining the plan rim contour which we prefer to employ in arriving at the novel form of wheel illustrated in Figs. 1, 2 and 3, may be described as follows:

Referring to Fig. 4, any basic and preferably equilateral triangle ABC of suitable size is first laid out and the circle DEF having the radius R is inscribed within it. The arcs GK, LN, and OQ each having a radius R/2, are struck from the altitude lines AF, BD, and CE respectively of the basic triangle, tangent to the inscribed circle. The arcs NO, QG, and KL are struck from outside extensions of the altitude lines AF, BD, and CE, each preferably having a radius 2R. To complete the outline, the small arcs SH, HT, UM, MV, WP and PX, having the radii R/4, are drawn tangent to the arcs GK, LN, OQ and to the arcs KL, NO, and QG. The plan outline of our handwheel shown in Figs. 1, 2 and 3 is then defined by the substantially triangular or modified hexagonal shape SHTUMVWPX.

Figure 7:
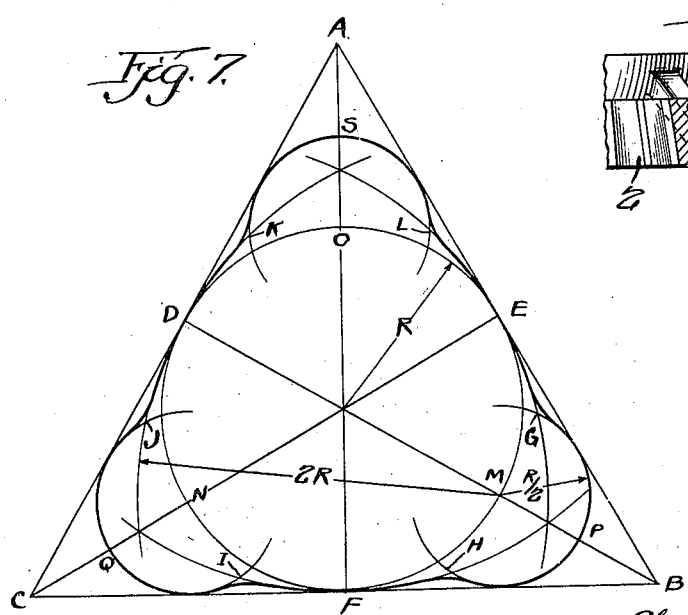
Fig. 7 is a graphical description of the outside rim contour of the handwheel shown in Fig. 5.

Another valve rim contour is illustrated in Fig. 5, being slightly different in shape to that shown in Fig. 2, but possessing the same general functional characteristics. It is substantially triangular in shape and is provided with concave peripheral portions which cooperate with parts of the human hand previously referred to herein to afford a firm, convenient, non-slipping grip. The hub portion I is provided with a tapered octagonal opening 2 and is connected to the outside rim 6 by means of the arms or ribs 7 and 11. The plan shape of the rim 6 may briefly be described as that of a triangle with knobbed or circular apices and with the sides convex or slightly bulged outward to form notches or concave portions at the intersections of the sides with the knobbed apices. To describe in detail the manner in which the contour shown in Fig. 5 is arrived at, reference is made to Fig. 7 where, as was done in connection with the contour shown in Fig. 2, a basic triangle ABC is laid out and a circle DEF having the radius R is inscribed within it. The arcs GH, IJ, and KL, having radii R/2, are struck from M, N, and O respectively, and then the arcs JK, LG, and HI, having radii 2R, are likewise struck from M, N, and O. The six outwardly facing notches at G, H, I, J, K, and L, formed by the intersection of the lower described two sets of arcs, are suitably filleted, as shown, in order to make the two sets of curved surfaces flow smoothly into one another. The outline of our handwheel rim as shown in Fig. 4 is then defined by the modified triangular shape EPFQDS.

A representation of a human hand is shown in Fig. 8 in order to explain more clearly and in greater detail the manner in which the rims of our handwheels cooperate with the configurations of the hand. In Fig. 8, the heel or section adjoining the wrist generally designated 12 is composed of two parts, the ball 13 at the base of the thumb, and the hypothenar eminence 14 below the little finger 16 and adjacent the wrist 17. The thumb is designated 18, the index finger 19, the middle finger 21, and the ring finger 22.

By close observation and study, it has been noted that the structure of the human hand is such as to give the heel 12 a shoulder effect which may readily be utilized in operating a valve if the valve handwheel is provided with concave shouldered portions for reception of the ball 13 or the hypothener eminence 14 in turning the handwheel one way or the other. In order to retain the ball 13 against such concave shouldered portions, the thumb 18 must be curled tightly around and behind the shoulder, and similarly, to retain the hypothenar eminence in non-slipping contact with such concave shouldered portions, the little finger 16 or ring finger 22, or preferably both, must be draped tightly around, grasping the shoulder from behind. Thus, the most effective grip of a hand of any particular size is obtained by combining the thumb-locked ball 13 with the little finger- and/or ring finger-locked hypothenar eminence 14.

The application of this grip to the triangular wheel having the shape SHTUMVWPX (see Fig. 4), is illustrated in Fig. 9 and may be described as follows: The ball 13 of the palm is placed squarely against one of the three longer surfaces of the rim, WV for example, with a portion of the hypothenar eminence 14 bearing against the corner MV; the thumb 18 is draped peripherally around the rim and rests preferably on the X end portion of the long surface SX. If the thumb is not sufficiently long, another preferred placement for it is on the short surface at P. The middle finger is then draped over the small surface H opposite the surface WV and may extend to the underside of the wheel. The index finger 19 is then positioned over the S end portion of the long surface SX above the thumb, and the little finger 16 and the ring finger 22 are likewise draped over the long surface TU. Then, simply by squeezing the hand slightly a very effective grip is asserted upon the handwheel. With little or no practice the operator's hand will naturally assume this position on the wheel for it affords the easiest and most comfortable grasp.

A most effective grip as applied to the triangular wheel having the shape EPFQDS (see Fig. 7) is illustrated in Fig. 10 and may accordingly be described as follows: The heel 12 of the palm is placed squarely against any one of the three long surfaces, for example, IFH. The ball 13 bears against the concave portion at I and against the shoulder formed by the surface IQ while the hypothenar eminence 14 bears similarly into the concavity at H and against the shoulder HP. The thumb 18 is draped peripherally around the knob IQJ and preferably bears against the back of the knob near J. The middle finger 21 is draped over the knobbed apex KSL, the index finger 19 over the surface JDK, and the little- and ring-fingers 16 and 22 are similarly draped over the surface GEL, all fingers being curled tightly on the underside of the wheel. To turn clockwise (looking from the underside of the handwheel as in Fig. 10) the hypothenar eminence 14 is forced into the concavity at H and against the shoulder HP; similarly, to turn counter-clockwise, the ball 13 is forced into the concavity at I and against the shoulder IQ.

It has been found that handwheels shaped in accordance with the arrangement as herein disclosed are capable of transmitting 30 to 50% more torque from the average human hand to a valve stem than equivalent sizes of conventional round handwheels, for example. While this arrangement does not provide substantially more torque than that provided by the ordinary oval or T-shaped handle, nevertheless our triangular wheels have an advantage over these prior wheels in that ours can be grasped tightly from three different directions instead of two and yet transmit at least an equivalent amount of torque.

While we have illustrated and described in detail certain preferred embodiments of our invention, we do not desire to be limited to these specific rim contours but, on the contrary, desire only to be limited within the scope of the appended claims in light of the prior art.

We claim:

1. A handwheel for a valve or the like having a hub portion, a rim having approximately the shape of an equilateral triangle, the sides of said triangle being formed concave, the apices of said triangle being relatively flattened and formed concave.

2. A substantially triangular valve handwheel having a centrally located hub portion, said hub having indirectly connected thereto a rim portion having three long sides and three short sides, said sides having peripheral surfaces which are concave outwards in a horizontal plane and convex outwards in a vertical plane, thereby forming a valve handwheel rim contour in which the heel of the palm of the human hand may be received in rotating the handwheel.

CHARLES R. CRANE, II.
WILLIAM J. GARTZ.